(12) United States Patent
Klimenko et al.

(10) Patent No.: US 8,910,532 B2
(45) Date of Patent: Dec. 16, 2014

(54) ROTATION ANGLE AND TORQUE SENSOR

(75) Inventors: Valeri Klimenko, München (DE); Johann Jahrstorfer, München (DE)

(73) Assignee: Bourns, Inc., Riverside, CA (US)

( * ) Notice: Subject to any disclaimer, the term of this patent is extended or adjusted under 35 U.S.C. 154(b) by 0 days.

(21) Appl. No.: 13/523,265

(22) Filed: Jun. 14, 2012

(65) Prior Publication Data

US 2013/0019693 A1 Jan. 24, 2013

(30) Foreign Application Priority Data

Jul. 21, 2011 (DE) .......................... 10 2011 052 043

(51) Int. Cl.
| G01L 3/00 | (2006.01) |
|---|---|
| G01L 5/22 | (2006.01) |
| G01D 5/14 | (2006.01) |
| B62D 15/02 | (2006.01) |
| B62D 6/10 | (2006.01) |
| G01L 3/10 | (2006.01) |

(52) U.S. Cl.
CPC ............ *B62D 15/0215* (2013.01); *G01L 5/221* (2013.01); *G01D 5/145* (2013.01); *B62D 6/10* (2013.01); *G01L 3/104* (2013.01)
USPC .................................................. 73/862.331

(58) Field of Classification Search
USPC ....................................................... 73/862.331
See application file for complete search history.

(56) References Cited

U.S. PATENT DOCUMENTS

| 5,126,663 | A | * | 6/1992 | Shinjo ......................... 324/207.2 |
|---|---|---|---|---|
| 6,341,426 | B1 | * | 1/2002 | Okumura ........................ 33/1 PT |
| 7,258,027 | B2 | * | 8/2007 | Oike et al. ............... 73/862.331 |
| 2009/0319120 | A1 | * | 12/2009 | Hatanaka et al. ............... 701/34 |

FOREIGN PATENT DOCUMENTS

| DE | 19834322 A1 | * | 2/2000 | ................ G01L 3/04 |
|---|---|---|---|---|
| DE | 19962241 A1 | | 7/2001 | |
| EP | 1426750 A1 | | 6/2004 | |

* cited by examiner

*Primary Examiner* — Lisa Caputo
*Assistant Examiner* — Brandi N Hopkins
(74) *Attorney, Agent, or Firm* — Senniger Powers LLP

(57) ABSTRACT

The rotation-angle and torsion sensor has two gears that are connected so as not to turn with shaft sections, which [gears] mesh with gears. On one of the gears a unipolar or multipolar magnet is attached. On the other gear, magnetic flux guides matching to number of poles are attached, that are configured as L shapes. One leg of the flux tranducers points in the direction of the multipolar magnet while the other legs run parallel to the gear and in fact one on one side and the other on the other side of the gear, with these legs enclosing a second sensor between them that is situated in the gear.

16 Claims, 5 Drawing Sheets

ROTATION ANGLE AND TORQUE SENSOR

REFERENCE TO RELATED APPLICATION

This application claims priority to German application DE 10 2011 052 043.0, filed Jul. 21, 2011, the entire disclosure of which is incorporated by reference.

FIELD OF THE INVENTION

The invention relates to a rotation-angle and torque sensor.

BACKGROUND OF THE INVENTION

A preferred area of application of the present invention is steering of motor vehicles, in which not only the turning angle of a steering gear shaft is to be measured, but also the forces exerted on the steering gear shaft, which act as torque. This torque can be measured as the torque angle of a torsion bar placed between two sections of the steering gear shaft. The other parameters of the torsion bar are known with this.

DE 198 34 322 A1 discloses a rotation angle and torque sensor for simultaneous measurement of torque and rotation angle of a turnable shaft. On two shaft sections a first and a second gear is placed, that turn with the assigned shaft section. The first gear meshes with a third gear that carries a magnet. A first magnetic sensor is assigned to the magnet. The second gear of the other shaft section meshes with a fourth and fifth gear, with a magnet and a magnetic sensor also assigned to these gears. The number of teeth of the fourth and fifth gears differs by at least 1, so that in a known fashion the absolute rotational angle of the shaft section can be determined, even for rotational angles greater than 360°. The number of teeth on the third and fourth gears is the same, and likewise those of the first and second gear, so that with torsion-free rotation the third and fourth gears turn synchronously. If however, torsion occurs, then between the first and second shaft sections a twisting or a torque angle appears, so that the third and fourth gears possess differing rotational settings, which can be determined by evaluating the magnetic sensors assigned to the third and fourth gears, in that a difference signal is formed from the output signals of these two sensors. Summarized in brief, the known rotation-angle and torsion sensor has five gears, three magnets and three magnetic sensors.

Similar sensors for measuring a rotational angle and/or a torque are also known from EP 1 426 750 A1 and U.S. Pat. No. 7,258,027 B2, where gears, magnets and magnetic sensors are also used.

In the sensor named initially, what is problematical is the reciprocal screening of the magnets, whose magnetic fields are allowed to only influence the assigned magnetic sensor, but not the magnet adjoining the magnetic sensor. In regard to miniaturization of such sensors, problems therefore can arise. Also, the material costs of the magnets play an important role.

SUMMARY OF THE INVENTION

Therefore the task of the invention is to produce a rotational angle and torque angle that is simpler and freer from interference, which also can be manufactured more cost-effectively.

Briefly, therefore, the invention is directed to a rotation-angle and torsion sensor for a shaft comprising two shaft sections between which a torsion rod is placed, the sensor comprising: a first gear that is connected torque-proof with the first shaft section, a second gear, that is connected torque-proof with the second shaft section, with the first and second gears having the same number of teeth, a third gear that meshes with the first gear, a fourth gear and a fifth gear which mesh with the second gear, wherein the third and the fourth gear have the same number of teeth, which is smaller than the number of teeth of the first and the second gear, wherein the fifth gear has a number of teeth that differs by at least one from the number of teeth of the fourth gear, two magnets that are assigned to the fourth and fifth gear, and magnetic sensors that are assigned to the third, fourth and fifth gears, wherein circular-segment-shaped magnetic guides are attached on the fourth gear, wherein magnetic flux guides are attached on the third gear, the ends of which guides are placed at an interval to the circular-segment-shaped magnetic guides, and wherein legs of the magnetic guides are situated on both sides of the magnetic sensor assigned to the third gear.

Advantageous embodiments and additional forms of the invention can be gleaned from the subordinate claims.

As does the prior art, the rotation-angle and torque sensor of the invention uses five gears and three sensors, but only two magnets. Two magnetic sensors are assigned to one of the magnets. The first magnetic sensor is directly assigned to the corresponding magnet and detects its angular setting. The invention makes provision that at least two circular-segment-shaped magnetic guides, whose segments are at an interval to each other, are assigned to the first magnet. Magnetic fields of these circular-segment-shaped magnetic guides are guided by a corresponding number of magnetic flux guides to the second magnetic sensor, which measures magnetic field strength and preferably is a Hall sensor.

BRIEF DESCRIPTION OF THE FIGURES

In what follows, the invention is explained in greater detail using embodiment examples linked with the drawings. Shown are.

DETAILED DESCRIPTION OF PREFERRED EMBODIMENTS

Figure 1:
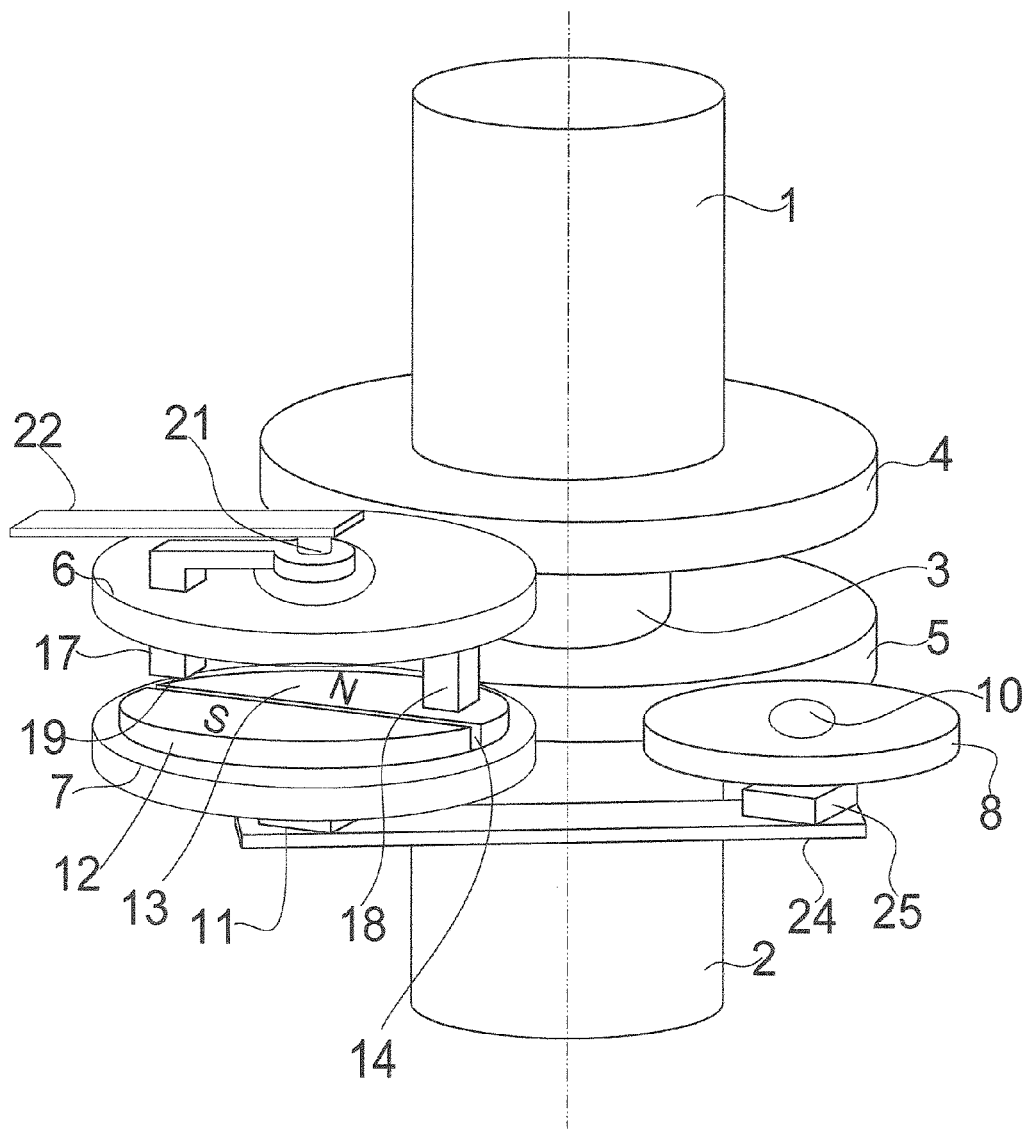
FIG. 1: a schematic perspective view of the rotation-angle and torque sensor according to the invention, seen at a slant from above
Figure 2:
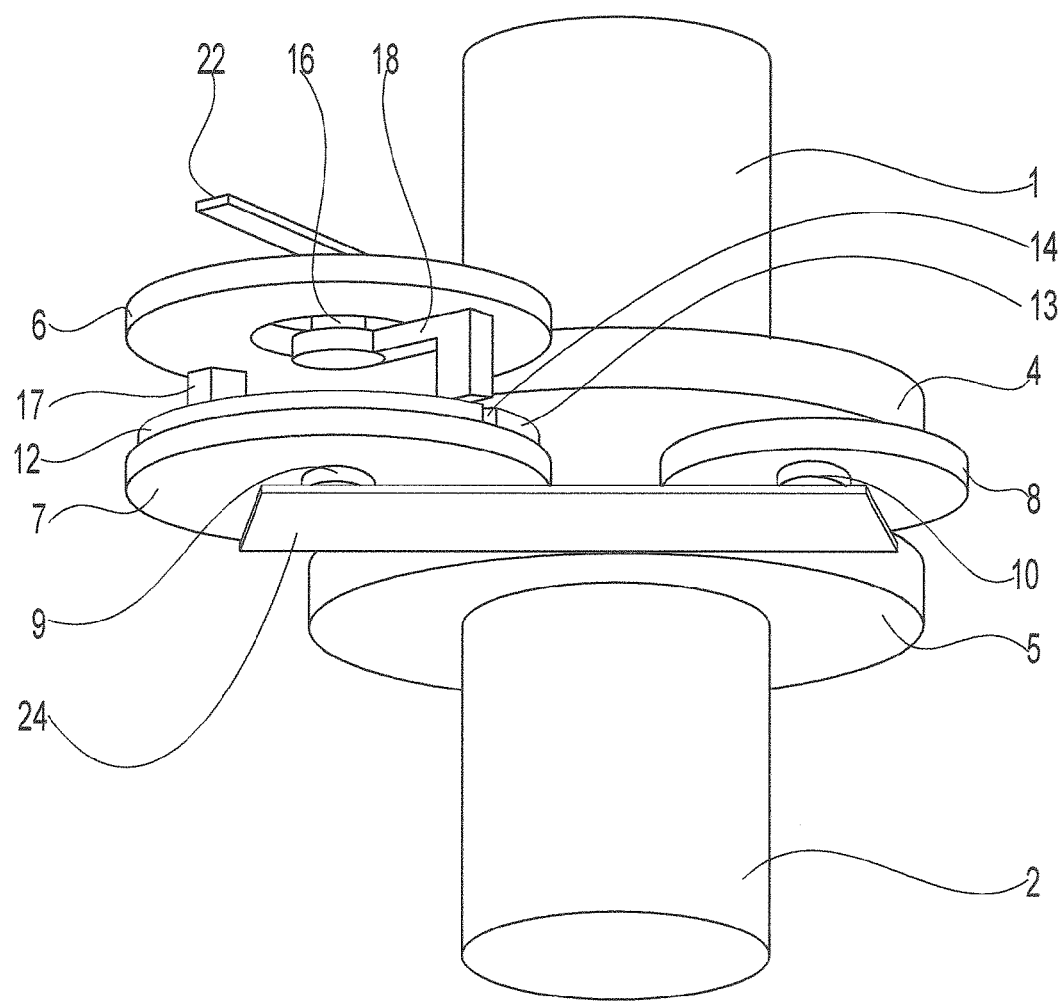
FIG. 2: a perspective schematic view of the rotation-angle and torsion sensor of FIG. 1, seen at a slant from below
Figure 3:
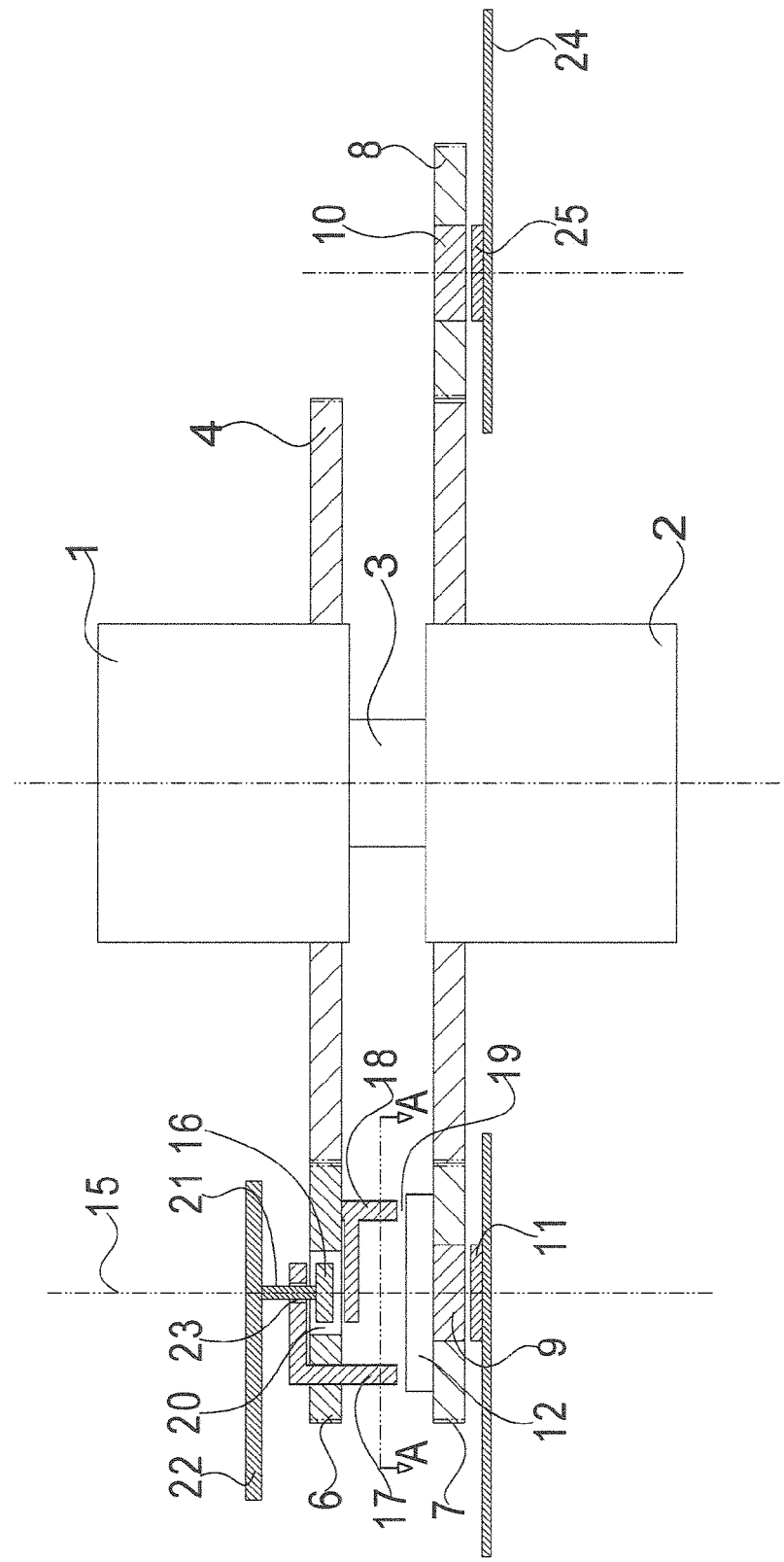
FIG. 3: a cross section of the rotation-angle and torsion sensor of FIGS. 1 and 2
Figure 4:
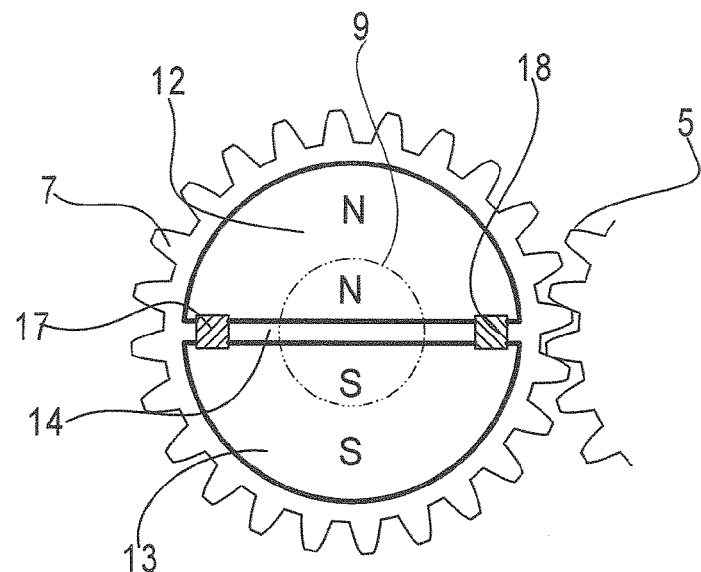
FIG. 4: an enlarged section view along line A-A of FIG. 3

The sensor of FIGS. 1 to 3 is attached to a shaft that has a first shaft section 1, which for example is the steering gear shaft of a motor vehicle steering mechanism, as well as a second shaft section 2, which for example is the so-called pinion shaft of the motor vehicle steering. The two shaft sections 1 and 2 are connected to each other by a torsion rod 3.

A first gear 4 with a number of teeth N1 is attached so as not to turn with the first shaft section 1. A second gear 5 with the same number of teeth N1 is connected with the second shaft section 2. The first gear 4 meshes with a third gear 6, which has a second number of teeth N2 that is markedly smaller than the number of teeth N1 as a rule for purposes of a gear ratio. The second gear 5 meshes with a fourth gear 7, which has the same gear module as the third gear 6. Additionally, second gear 5 meshes with a fifth gear 8, whose number of teeth N3 is likewise considerably smaller than the number of teeth N1 of the second gear 5, but which differs from the number of teeth N2 and in fact preferably by at least one tooth.

To the fourth gear 7 a first magnet 9 is assigned, that turns together with the gear 7 and is magnetized diametrically.

To the fifth gear 8 a second magnet 10 is assigned, which turns with the fifth gear 8 and likewise is magnetized diametrically.

To the first magnet 9, a first sensor 11 is assigned, which is placed stationary on a strip conductor plate 24 and detects the rotational setting of the first magnet 9. This for example can be an AMR sensor.

The first sensor 11 is placed on the side of the fourth gear 7 that points toward the second shaft section 2. On the side of the fourth gear 7 pointing to the first shaft section 1, at least two circular-segment-shaped magnetic guides 12 and 13 are placed, which are magnetically coupled with the first magnet 9. Between the circular-segment-shaped magnetic guides, an interval 14 is present that forms an air gap. The two magnetic guides 12 and 13 made of ferromagnetic material are connected so as to turn with fourth gear 7 and are configured as flat disks. The magnetic guide 12 is magnetized by the first magnet 9 in a first magnetic direction (south, for example), while the other magnetic guide 13 is magnetized in the opposite direction (north, for example). Thus the interval 14 between the two magnetic guides 12 and 13 forms an air gap.

The fourth gear 7 understandably is made of a non-magnetic material.

The third gear 6 and the fourth gear 7 can turn about a common rotational axis 15 which lies parallel to the rotational axis of the shaft.

A second magnetic sensor 16 is placed in a central opening 20 of third gear 6. Additionally, the multiple magnetic flux guides 17 and 18, matching the number of the circular-segment-shaped magnetic guides 12 and 13, are attached to third gear 6. In the cross section of FIG. 3, the magnetic flux guides 17 and 18 are essentially L-shaped, with one leg in each case projecting in the direction of the circular-segment-shaped magnetic flux guides 12 and 13 and there ending at a slight interval 19, with this interval 19 forming an air gap. The other legs of the magnetic flux guides 17 and 18 run parallel to the plane of the third gear 6, with one of these horizontal legs running on the one side of the third gear 6 and the other of these parallel legs running on the other side of the third gear 6. Thus, second sensor 16 lies between the two horizontal legs of the magnetic flux guides 17 and 18, for which third gear 6 has a recess 20. Second magnetic sensor 16 is held by a pin 21 which is attached to a stationary strip conductor plate 22. The pin 21 projects through an opening 23 in the horizontal leg of the magnetic flux guide 17, with electrical conductors also being guided to the second magnetic sensor 16 through this pin.

In place of the pin 21, also just the electrical conductors can be used to support the second magnetic sensor 16, if they have sufficient mechanical strength.

The circular-segment-shaped magnetic guides 12 and 13 on the one hand, and the magnetic flux guides 17 and 18 on the other hand, are placed so that the legs of the flux guides 17 and 18 that point to the magnetic guides 12 and 13, are in a neutral setting that is defined by a torsion angle of zero, directly over the interval 14 between the two circular-segment-shaped magnetic guides 12 and 13. Thus the magnetic circuit between the poles of the circular-segment-shaped magnetic guides 12 and 13 runs through the above-named legs of the flux guides 17 and 18 and the gap where second sensor 16 is placed, so that between the horizontal legs of the flux guides 17 and 18 no magnetic field appears, and the second sensor 16 still generates no output signal. If a torsion angle does appear between the two shaft segments 1 and 2, then the third and fourth gears 6 and 7 are differentially twisted, so that the legs of the flux guides 17 and 18 projecting out to the circular-segment-shaped magnetic guides 12 and 13 are twisted out through the air gap formed by interval 14, and via the flux guides 17 and 18, the magnetic field is directed to the second sensor 16, which delivers an output signal proportional to the strength of the magnetic field, which is a measure for the torsional angle to be measured.

The third sensor 25 assigned to the second magnet 10 is designed similar to the first sensor 11 and is attached on a stationary strip conductor plate 24, with the first sensor 11 and the third sensor 25 being able to be attached to a common strip conductor plate 24. Since the fourth and fifth gear 7 and 8 have differing numbers of teeth (N2 and N3), which preferably differ by at least 1, then in known fashion also an angular range of more than 360° can be detected for the rotation angle of the second shaft section 2.

The sensitivity of the second sensor 16 responsible for the torsion angle substantially depends on the N1:N2 gear ratio of gears. The larger the gear ratio, the larger the relative twisting of the two gears 6 and 7 against each other if a torsion angle is present.

However, a high gear ratio entails a very small diameter and thus a small number of teeth of the third and fourth gears 6 and 7. Since these gears 6 and 7 in practice are made of plastic, the number of teeth cannot be made as small as desired, since if the shaft sections 1 and 2 rotate rapidly, high temperatures appear due to friction, and thus greater wear on the gears.

Figure 5:
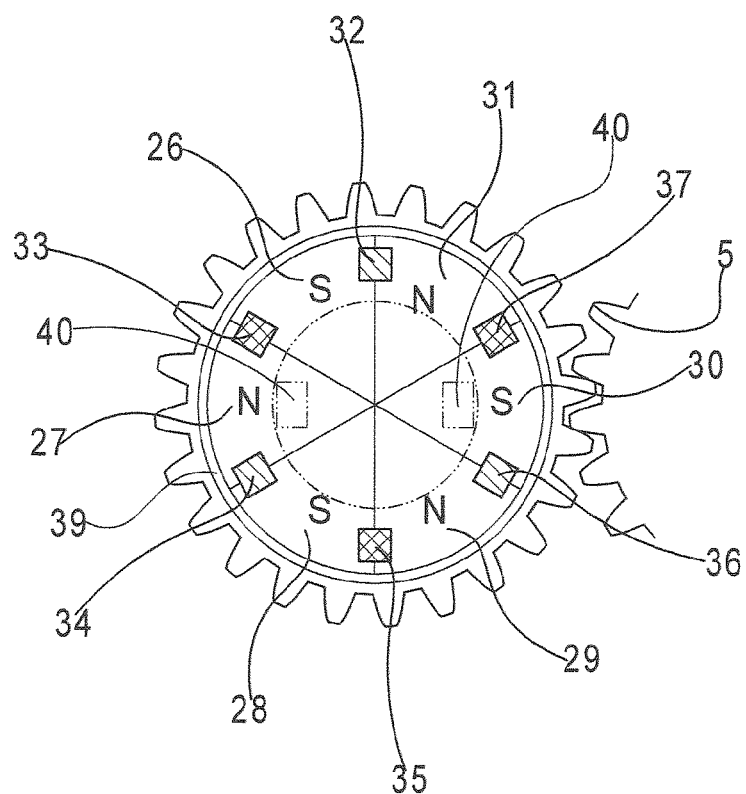
FIG. 5: a section view similar to FIG. 4 of a second embodiment example of the invention
Figure 6:
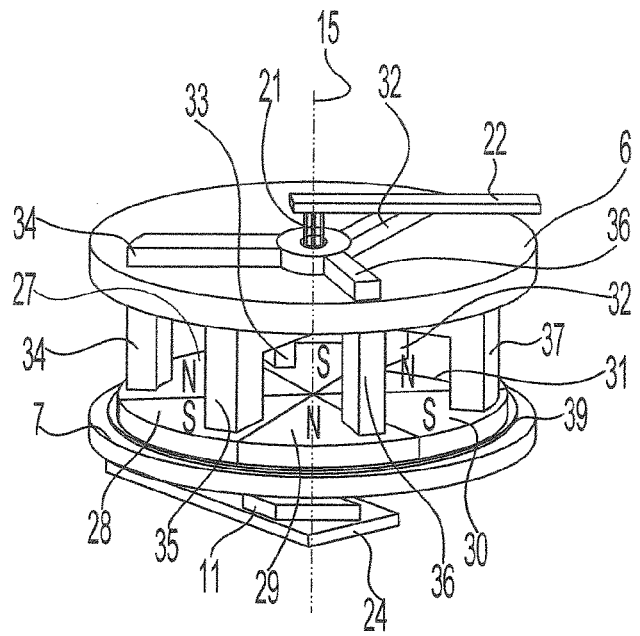
FIG. 6: a view similar to FIG. 1 for the second embodiment example of the invention
Figure 7:
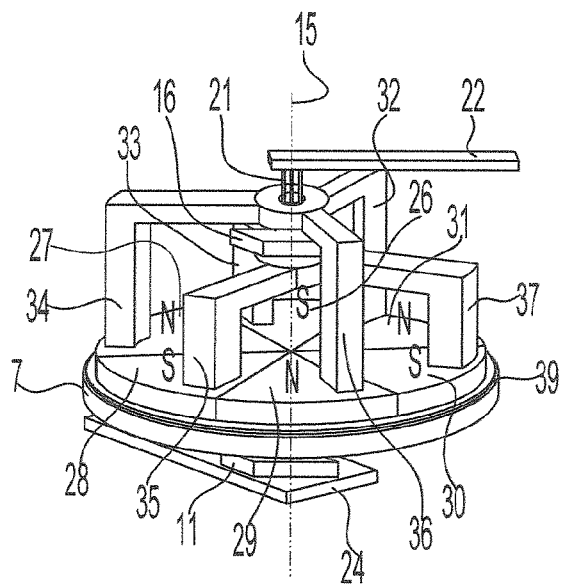
FIG. 7: a view similar to FIG. 6, but with the gear left out to clarify the arrangement of the magnetic flux guides.

To nonetheless obtain a higher measurement sensitivity and a higher resolving power for the torsion angle, the further embodiment of the invention as per FIGS. 5 to 7 makes provision to use a multipolar axially magnetized magnet and a larger number of magnetic flux guides.

In the embodiment example of FIG. 5, on the fourth gear 7 a multipolar magnet with six circular-segment-shaped magnetic segments 26, 27, 28, 29, 30, 31 is placed, which alternately are magnetized in the north and south direction. Corresponding to the number of circular-segment-shaped magnetic segments, correspondingly many magnetic flux guides 32, 33, 34, 35, 36, 37 are provided, with the flux guides 32, 34, 36 being connected with each other and with their horizontal legs running on the one side of the third gear 6, while the other flux guides 33, 35 and 37 are connected to each other and running with their horizontal legs on the other side of the third gear 6. With this arrangement, smaller relative rotation angles between the third and fourth gear 6 and 7 lead to a larger change in the magnetic field on the second sensor 16, and thus to an improved resolving power for measurement of the torsion angle.

With this embodiment example, according to a variant, the first magnet 9 can be provided as a bipolar, diametrically magnetized magnet as in the embodiment example of FIGS. 1 and 3, with the first magnet 9 on one side and the multipolar magnet on the other side of the fourth gear 7 uncoupled from each other by a magnetic screen plate 39, so that the first magnet 9 has the same function as with the first embodiment example. According to one alternative, the first magnet 9 can also be replaced by magnetic cables that run through a north and a south pole of the multipolar magnet through the fourth gear 7 and through openings in the magnetic screening plate 39, to transfer the corresponding magnetic field effect of a dipolar magnet to the first magnetic sensor 11.

Also, use of multipolar magnets has an advantage in that when a torque appears, the resulting magnetic field strength acting on the second sensor 16 is stronger than if the dipolar magnet 9 of the embodiment example of FIGS. 1 to 3 is used.

For the sake of completeness, we again mention that all the gears 4 to 8 are made of a nonmagnetic material like plastic. The gears 6, 7 and 8 are held in a tensioning frame of known design, such as is described in DE 199 62 241 A1.

In view of the above, it will be seen that the several objects of the invention are achieved and other advantageous results attained.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above embodiments without departing from the scope of the invention, it is intended that all matter contained in the above description and shown in the accompanying drawings shall be interpreted as illustrative and not in a limiting sense.

The invention claimed is:

1. A rotation-angle and torsion sensor for a shaft comprising two shaft sections between which a torsion rod is placed, the sensor comprising:
   a first gear that is connected torque-proof with the first shaft section;
   a second gear, that is connected torque-proof with the second shaft section, with the first and second gears having the same number of teeth;
   a third gear that meshes with the first gear;
   a fourth gear and a fifth gear which mesh with the second gear;
   wherein the third and the fourth gear have the same number of teeth, which is smaller than the number of teeth of the first and the second gear;
   wherein the fifth gear has a number of teeth that differs by at least one from the number of teeth of the fourth gear, exactly two magnets that are assigned one to each of the fourth and fifth gear and magnetic sensors that are assigned to the third, fourth and fifth gears;
   wherein circular-segment-shaped magnetic guides are attached on the fourth gear;
   wherein magnetic flux guides are attached on the third gear, the ends of which guides are placed at an interval to the circular-segment-shaped magnetic guides; and
   wherein the magnetic flux guides attached on third gear have legs which are situated on both sides of the magnetic sensor assigned to the third gear;
   wherein the magnet assigned to the fourth gear is coupled to the sensor assigned to the third gear by the circular-segment-shaped magnetic guides attached on the fourth gear and by the magnetic flux guides attached to the third gear;
   wherein the magnet assigned to the fourth gear is also coupled to the sensor assigned to the fourth gear; and
   wherein the sensor on the third gear outputs the torque angle.

2. The rotation-angle and torsion sensor according to claim 1, wherein the circular-segment-shaped magnetic guides have an interval between them that forms an air gap.

3. The rotation-angle and torsion sensor according to claim 1, wherein the magnetic flux guides are situated on the side of the fourth gear that points to the third gear, and that the first sensor is situated on the side of the fourth gear that is opposite to them.

4. The rotation-angle and torsion sensor according to claim 1, wherein the magnetic flux guides have an L-shaped cross section with a leg running parallel to the third gear and a leg perpendicular to the third gear, with one of the parallel-running legs running on one side of the third gear and one parallel-running leg of the other flux guide running on the other side of the third gear, with the second sensor placed between these parallel legs.

5. The rotation-angle and torsion sensor according to claim 4, wherein the second sensor is placed in an opening of the third gear and is connected via a pin and/or electrical conductors, that project through an opening in one of the legs running parallel to the third gear, with a stationary strip conductor plate.

6. The rotation-angle and torsion sensor according to claim 1, wherein the first sensor is an AMR sensor and the second sensor is a Hall sensor.

7. The rotation-angle and torsion sensor according to claim 1, wherein the circular-segment-shaped magnetic guides are formed by a multipolar magnet, which has a multiplicity of magnetic segments, that are alternately magnetized in north and south directions, and that two groups of magnetic flux guides are provided, with a first group having horizontal legs on one side of the third gear and the other group having horizontal legs that are placed on the other size of the third gear.

8. The rotation-angle and torsion sensor according to claim 7, wherein the multipolar magnet is magnetically screened by a magnetic screen plate vis-à-vis the first sensor.

9. The rotation-angle and torsion sensor according to claim 8, wherein a north pole and a south pole of the multipolar magnet are connected by magnetic conductors, that extend through the fourth gear and the magnetic screen plate in the direction of the first sensor.

10. The rotation-angle and torsion sensor according to claim 2, wherein the magnetic flux guides are situated on the side of the fourth gear that points to the third gear, and that the first sensor is situated on the side of the fourth gear that is opposite to them.

11. The rotation-angle and torsion sensor according to claim 2, wherein the magnetic flux guides have an L-shaped cross section with a leg running parallel to the third gear and a leg perpendicular to the third gear, with one of the parallel-running legs running on one side of the third gear and one parallel-running leg of the other flux guide running on the other side of the third gear, with the second sensor placed between these parallel legs.

12. The rotation-angle and torsion sensor according to claim 3, wherein the magnetic flux guides have an L-shaped cross section with a leg running parallel to the third gear and a leg perpendicular to the third gear, with one of the parallel-running legs running on one side of the third gear and one parallel-running leg of the other flux guide running on the other side of the third gear, with the second sensor placed between these parallel legs.

13. The rotation-angle and torsion sensor according to claim 2, wherein the first sensor is an AMR sensor and the second sensor is a Hall sensor.

14. The rotation-angle and torsion sensor according to claim 3, wherein the first sensor is an AMR sensor and the second sensor is a Hall sensor.

15. The rotation-angle and torsion sensor according to claim 4, wherein the first sensor is an AMR sensor and the second sensor is a Hall sensor.

16. The rotation-angle and torsion sensor according to claim 5, wherein the first sensor is an AMR sensor and the second sensor is a Hall sensor.

* * * * *